United States Patent
Hoang et al.

(10) Patent No.: US 8,672,290 B2
(45) Date of Patent: Mar. 18, 2014

(54) SELF ALIGNING SPHERICAL BACKSEAT ASSEMBLY FOR A VALVE

(75) Inventors: Chau Hoang, Houston, TX (US); David Daniel Comeaux, Houston, TX (US); Theerapong Prachakvej, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 168 days.

(21) Appl. No.: 13/419,083

(22) Filed: Mar. 13, 2012

(65) Prior Publication Data
US 2013/0240774 A1 Sep. 19, 2013

(51) Int. Cl.
*F16K 3/00* (2006.01)

(52) U.S. Cl.
USPC ............... 251/86; 251/329; 251/330

(58) Field of Classification Search
USPC ................ 251/86, 214, 326–330
See application file for complete search history.

(56) References Cited

U.S. PATENT DOCUMENTS

| | | | | |
|---|---|---|---|---|
| 368,073 A | * | 8/1887 | Convert | 251/86 |
| 801,708 A | * | 10/1905 | Bowes, Jr. | 251/330 |
| 961,505 A | * | 6/1910 | Little | 251/86 |
| 1,165,197 A | * | 12/1915 | Marsh | 251/86 |
| 1,638,162 A | * | 8/1927 | Kirschbraun et al. | 251/330 |
| 2,449,119 A | * | 9/1948 | Holicer | 251/86 |
| 2,780,233 A | * | 2/1957 | Volpin | 137/315.29 |
| 3,152,786 A | * | 10/1964 | Soderberg et al. | 251/330 |
| 4,120,596 A | * | 10/1978 | Kunkle | 251/330 |
| 4,307,745 A | | 12/1981 | McGee | |
| 4,540,013 A | | 9/1985 | Furley et al. | |
| 4,570,659 A | | 2/1986 | Karr, Jr. | |
| 4,658,848 A | | 4/1987 | Meyer et al. | |
| 4,682,757 A | | 7/1987 | Shelton | |
| 4,714,237 A | * | 12/1987 | Linderman et al. | 251/330 |
| 4,860,784 A | | 8/1989 | Petersen et al. | |
| 4,991,619 A | * | 2/1991 | della Porta | 251/330 |
| 5,012,841 A | | 5/1991 | Kueffer | |
| 5,127,629 A | | 7/1992 | Holliday | |
| 5,201,336 A | | 4/1993 | Taylor et al. | |
| 5,238,252 A | * | 8/1993 | Stewen et al. | 251/330 |
| 5,435,520 A | * | 7/1995 | Vyvial | 251/330 |
| 5,454,547 A | | 10/1995 | Brown | |
| 5,730,419 A | | 3/1998 | Williams et al. | |
| 6,536,740 B2 | | 3/2003 | Hademenos et al. | |
| 6,811,140 B1 | | 11/2004 | Maini | |
| 6,964,304 B2 | | 11/2005 | Skeels et al. | |
| 7,309,058 B2 | | 12/2007 | Hunter et al. | |

FOREIGN PATENT DOCUMENTS

GB      2422648 A      8/2006

OTHER PUBLICATIONS

GB Combined Search and Examination Report dated Mar. 26, 2013 from corresponding Application No. GB1304242.9.

* cited by examiner

*Primary Examiner* — John Bastianelli
(74) *Attorney, Agent, or Firm* — Bracewell & Giuliani LLP

(57) ABSTRACT

A gate valve assembly having a body, a gate, a stem, and a backseat for sealing between the stem and the body. The backseat is an annular member with a complementary surface on its inside that fits over a spherically shaped section of the stem; thus allowing the backseat to rotate and pivot with respect to the stem. An outer surface of the backseat is beveled for sealingly engaging a stem passage formed through the body. A flex member is provided that is for sealing a surface adjacent the backseat. The flex member can form a seal between the backseat member and the stem or between an annular retainer and the backseat.

16 Claims, 3 Drawing Sheets

SELF ALIGNING SPHERICAL BACKSEAT ASSEMBLY FOR A VALVE

BACKGROUND

1. Field of Invention

The invention relates generally to a valve assembly. More specifically, the invention relates to a backseat assembly for a gate valve assembly that is pivotable with respect to a stem of the gate valve assembly.

2. Description of Prior Art

Gate valves typically have a body with a cavity intersected by a flow passage. A gate moves in the cavity between a closed position, blocking flow through the flow passage and an open position that allows flow through the passage. A stem is usually included for moving the gate that engages the gate, and when rotated, causes the movement of the gate. The stem extends through a stem passage in the body of the gate valve. Stem seals seal between the stem and the stem passage, preventing leakage of pressure from the cavity.

Gate valves sometimes include a backseat feature for sealing between a valve stem and valve bonnet so that packing in the valve assembly can be changed. Backseats are typically made up of complimentary profiled surfaces in the stem and valve bonnet that when urged together isolate pressure communication along the stem. Backseats are generally energized by the pressure in the flow through the valve exerting a force on a bottom surface of the valve stem and urging together the profiled surfaces in the stem and bonnet.

SUMMARY OF THE INVENTION

Provided herein is an example of a gate valve assembly that includes a body with an inner cavity. A neck opening is formed through the body that has a conically shaped portion intersecting the cavity. This example of the gate valve assembly also includes a stem that projects into the neck opening in the body and having an end in the cavity that is coupled to an end of a gate. A profile circumscribes a portion of the stem that has a radius that changes along a length of the stem. A ring like backseat member is on the profile, that can rotate and pivot with respect to the stem. The backseat member has an inner surface complementary to an outer surface of the profile. An outer surface on the backseat member has a portion shaped complementary to the conically shaped portion of the neck opening. Thus when the stem is urged in a direction that wedges the backseat member between the profile and the neck portion, a seal is formed between the stem and neck opening. An annular retainer is optionally mounted around the stem and positioned adjacent a lower surface of the backseat member to define a resilient sealing interface between the retainer and backseat member, so that when the stem tilts from an aligned position to an unaligned position, the sealing interface is maintained in the unaligned position. The retainer includes a body, a furrow formed in an outer radial surface of the body that defines a spring like flex element that projects radially outward from the body and that biases against the lower surface of the backseat member to form a sealing interface. An o-ring is provided in a space between an upper end of the body and a lower end of the profile. A recess may be formed along the inner surface of the backseat member along with an elongated flex leg that depends from an interface between the recess and inner surface, where the flex leg biases against the profile. In an example, the gate valve assembly further includes an annular retainer circumscribing the stem adjacent a lower end of the profile and a soft metal inlay on an upper surface of the retainer that contacts a lower surface of the backseat member that forms a sealing interface. Optionally, the flex leg forms a sealing interface when biased against the profile that is maintained with rotation and tilting of the stem with respect to the backseat member. In one example, the profile has a spherical type curvature.

Also described herein is a gate valve assembly that is made up of a body with an inner cavity, a stem passage in the body having a conically shaped opening that is adjacent the cavity, an elongated cylindrically shaped stem that extends from within the cavity and into the stem passage, a profile circumscribing a portion of the stem having a curved outer surface that resembles a portion of a sphere, an annular backseat member having an inner surface formed complementary to the curved outer surface of the profile and an outer surface that is in selective sealing engagement with the conically shaped opening, and a spring like member that forms a sealing interface adjacent a surface of the backseat member when the outer surface of the backseat member is in sealing engagement with the conically shaped opening. The spring like member can be a flex leg disposed on the inner surface of the backseat member and that is selectively biased against the profile. A recess may be formed in the backseat member, where the recess extends radially outward a distance from the inner surface and substantially parallel with the inner surface to define the flex leg. In one optional embodiment, the gate valve assembly further includes an annular retainer circumscribing the stem and having a soft metal inlay on an upper surface that sealingly engages a lower surface of the backseat member. The spring like member may be a flex element that resiliently maintains a sealing interface on a lower surface of the backseat member. The flex element may optionally be part of an annular retainer that circumscribes the stem adjacent a lower end of the profile and wherein a metal o-ring is disposed in sealing contact between an inner surface of the annular retainer and an outer circumference of the stem.

Another example embodiment of a gate valve assembly disclosed herein includes a body with an inner cavity, a stem passage in the body having a conically shaped opening that is adjacent the cavity, a stem assembly comprising an elongated cylindrically shaped stem that extends from within the cavity and into the stem passage, a profile circumscribing a portion of the stem having a curved outer surface, and an annular retainer circumscribing the stem adjacent a lower end of the profile. This embodiment of the gate valve assembly includes an annular backseat member circumscribing a portion of the profile that provides a means for providing a seal between the stem and stem passage and that maintains the seal when the stem is tilted into an unaligned position. A spring like member may be includes that forms a sealing interface adjacent a surface of the backseat member when the outer surface of the backseat member is in sealing engagement with the conically shaped opening. In an example, the backseat member has an inner surface formed complementary to the curved outer surface of the profile.

BRIEF DESCRIPTION OF DRAWINGS

Some of the features and benefits of the present invention having been stated, others will become apparent as the description proceeds when taken in conjunction with the accompanying drawings, in which.

Figure 1:
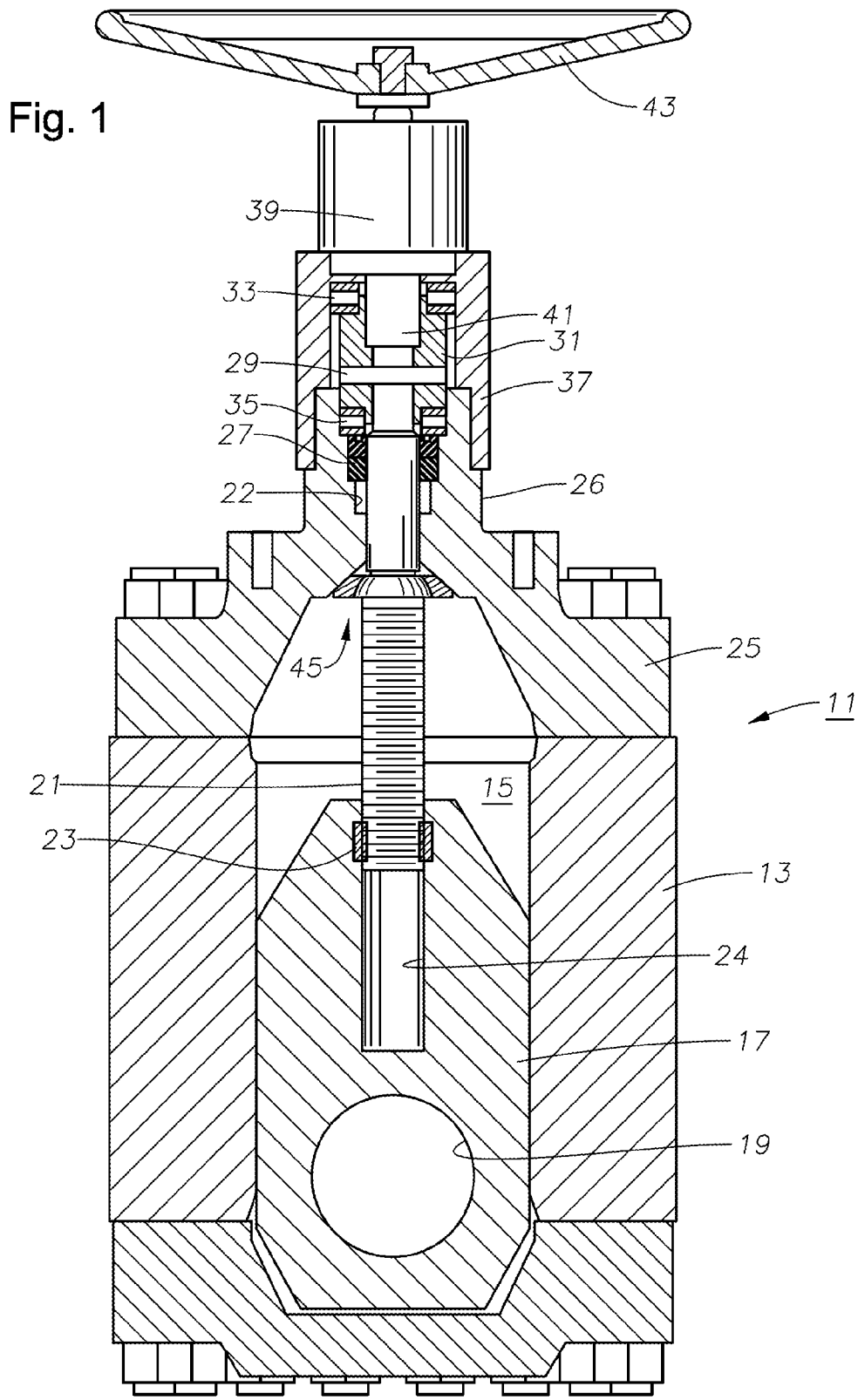
FIG. 1 is a side partial sectional view of an example embodiment of a valve assembly having a backseat stem seal in accordance with the present invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation. Accordingly, the improvements herein described are therefore to be limited only by the scope of the appended claims.

Referring to FIG. 1, gate valve 11 is of a type typically used in oilfield applications for controlling well fluid flow. Valve 11 has a body 13, which may be a single piece or multiple pieces as shown. Body 13 has a central gate cavity 15 having aligned inlet and outlet ports (not shown) for the flow of fluid through valve 11. Gate 17 strokes within gate cavity 15 and may be a single slab or a two-slab type. Gate 17 has an aperture 19 that aligns with the inlet and outlet ports (not shown) of valve 11 in the open position. Gate 17 blocks flow when in the closed position, which is the position shown in FIG. 1.

A stem 21 connects to gate 17 for moving gate 17 between the open and closed positions. Generally, in gate valves, there are two types of stems, one of which translates axially when rotated, referred to as a rising stem, and another that remains axially stationary when rotated, referred to as a non-rising stem. In this embodiment, stem 21 is a non-rising type. Stem 21 extends through a stem passage 22 into cavity 15, stem passage 22 being in fluid communication with cavity 15. Stem 21 engages a threaded nut 23 in gate 17 that translates rotational motion of stem 21 into axial movement of gate 17. When gate 17 moves upward to the open position, a lower portion of stem 21 will be located in a cavity 24 in gate 17.

Body 13 includes a bonnet 25, which is an upper housing that bolts to the upper end of body 13. Bonnet 25 forms the upper end of gate cavity 15 and has a neck 26 through which stem passage 22 extends. Stem seals 27 in stem passage 22 seal around stem 21 to prevent leakage of pressurized fluid from gate cavity 15. Stem seals 27 may be of a variety of types.

A variety of devices may be used to impart rotational motion to stem 21, including hydraulic, electrical and manual. In this example, a roll pin 29 connects the upper end of stem 21 to a bearing carrier 31. An optional bearing carrier 31 has upper and lower bearings 33, 35 for accommodating axial thrust imposed on stem 21 due to pressure in gate cavity 15. Smaller valves, particularly those having lower pressure ratings, may not require thrust bearings 33, 35. Bearing carrier 31 mounts rotatably within a stationary collar 37. Collar 37 secures by threads to the upper end of bonnet neck 26.

A gear box 39 mounts to collar 37 in this embodiment. Gear box 39 has an output shaft 41 that extends into a polygonal receptacle in bearing carrier 31. A hand wheel 43 connects to the input of gear box 39. Gear box 39 provides a mechanical advantage to the rotation of hand wheel 43. Gear box 39 is optional and many gate valves, particularly those of smaller size and lower pressure ratings, do not utilize a gear box.

A backseat seal assembly 45 locates at junction of stem passage 22 with the upper end of gate cavity 15. Backseat seal assembly 45 is normally in an unsealed condition, which allows any pressure in gate cavity 15 to communicate to stem seals 27. In the event of leakage of stem seals 27, the operator can actuate backseat seal assembly 45 to seal the pressure in gate cavity 15. Once the pressure in gate cavity 15 is relieved, the operator can replace stem seals 27.

Figure 2:
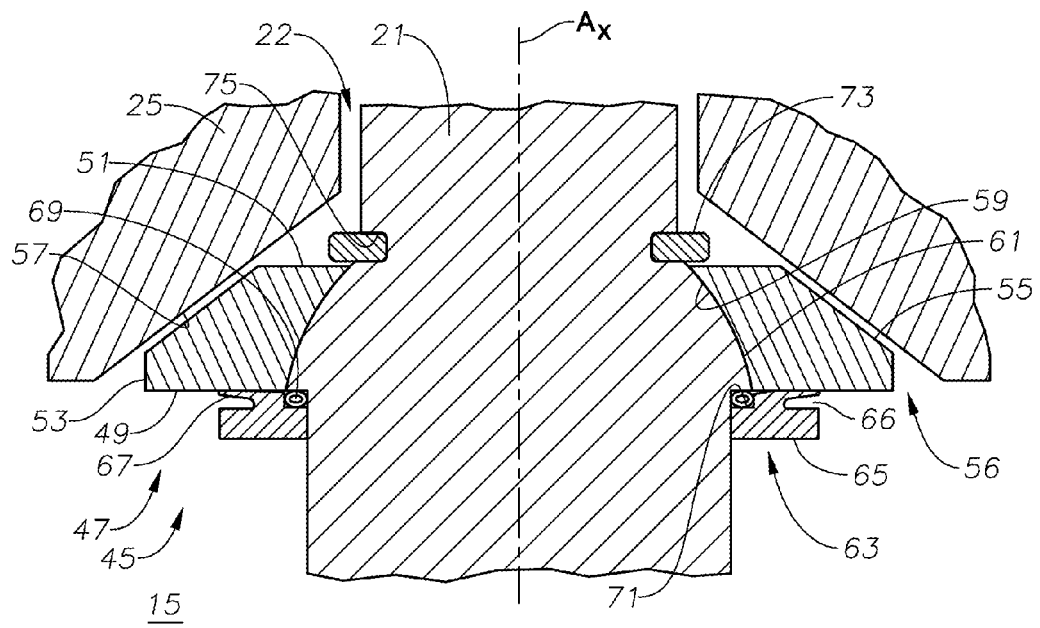
FIG. 2 is a side sectional view of an example of the backseat stem seal of FIG. 1 between a stem and a bonnet and in an unsealed position in accordance with the present disclosure.

FIG. 2 is a detailed side sectional view of an example of a portion of the gate valve assembly 11 of FIG. 1 that illustrates the backseat seal assembly 45 in an expanded view. The backseat seal assembly 45 of FIG. 2 is illustrated as having an annular backseat member 47 with lower and upper surfaces 49, 51 that are substantially normal to an axis $A_X$ of the stem 21. The outer radial periphery of the backseat member 47 includes a lower portion that is substantially parallel with the axis $A_X$ and extends upward from an outer edge of the lower surface 49. At an upper end of the lower portion 53, the outer radial periphery of the backseat member 47 bevels radially inward to define an upper portion 55 shown having a surface that extends at an angle oblique to the axis $A_X$. Distal from the lower portion 53, the upper portion 55 terminates at an outer radial end of the upper surface 51. Further illustrated in the example of FIG. 2 is that the lower end of the stem passage 22 flares radially outward to define an opening 56 shown intersecting with the cavity 15. The sides of the opening 56 define a sealing surface 57 that has a slope approximately complementary to the slope of the upper portion 55.

An inner surface 59 of the backseat member 47 of FIG. 2 is curved with respect to its axis; and where the curvature is complementary to a profile 61 shown formed on an outer circumference of the stem 21. In one example embodiment, the profile 61 resembles a portion of a sphere, so that when engaged with the profile 61, the backseat member 47 can rotate at least partially about the stem 21. Moreover, the corresponding configurations of the inner surface 59 and profile 61 allow pivoting of the backseat member 47 with respect to the stem 21.

An annular retainer 63 is further included in the example of the backseat seal assembly 45 of FIG. 2. In the example of FIG. 2, the retainer 63 includes a ring-like body 65 that mounts on an outer surface of the stem 21 disposed adjacent to and below the lower surface 49. A furrow 66 is provided on an outer radial surface of the body 65 set axially downward from an upper surface of the body 65. The presence of the furrow 66 defines a cantilever like flex element 67 on the upper surface of the body 65 and along its outer periphery. In one example the flex element 67 is in biasing engagement with the lower surface 49 of the backseat member 47 and defines a sealing interface between the retainer 63 and backseat member 47. The lower end of the profile 61 juts radially inward and to define a transition 69 that in cross-section forms a 90 degree angle. A metal O-ring 71 is shown provided on an outer surface of the stem 21 and adjacent the transition 69. A rectangular groove on an inner radial surface of the body 65 provides an open space for the O-ring 71. Thus, a sealing means is provided by the O-ring 71 and flex element 67 for blocking pressure communication on a path between the backseat member 47 and stem 21.

A snap ring 73 may optionally be included with the backseat seal assembly 45. A groove 75 is shown formed circumferentially around the stem 21 and axially just above the profile 61. The presence of the snap ring 71 can help contain the respective axial positions of the backseat element 47 and snap ring 21.

Figure 3:
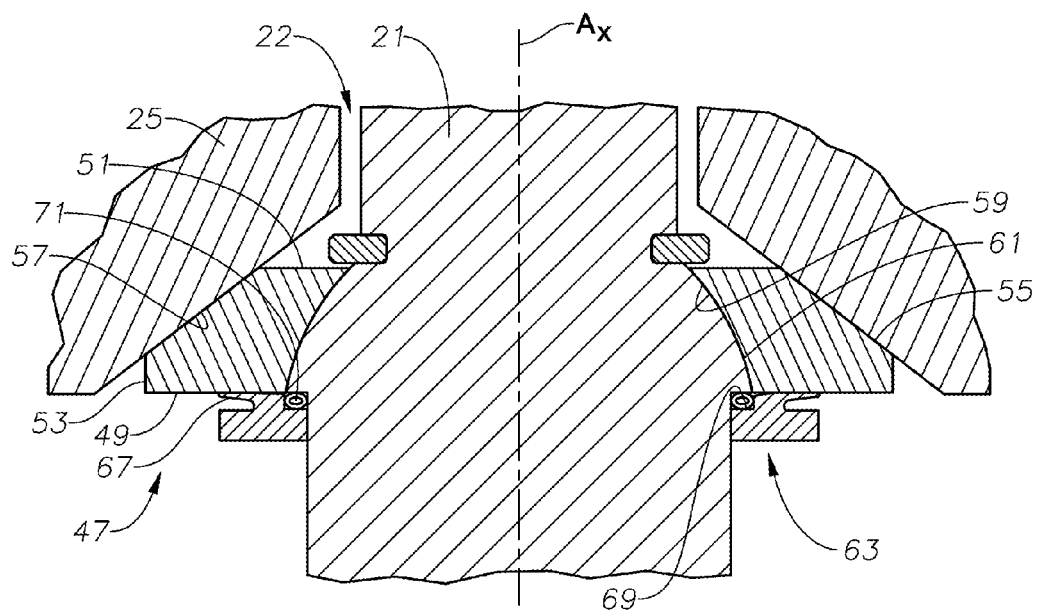
FIG. 3 is a side sectional view of an example of the backseat stem seal of FIG. 1 between a stem and a bonnet and in a sealed position in accordance with the present disclosure.

Referring now to FIG. 3, an example is shown of energizing the backseat seal assembly 45 against the bonnet 25 thereby blocking pressure communication through the stem passage 22. More specifically, a section of the upper portion 55 is shown contacting the sealing surface 57 thereby defining a sealing interface between the backseat member 47 and bonnet 25. As illustrated in the example of FIG. 3, the respective surfaces of the upper portion 55 and sealing surface 57 lie in planes that are disposed at angles to one another. In the example of FIG. 3, a lower section of the upper portion 55 engages the sealing surface 57 while a section of the upper portion proximate the upper surface 51 remains spaced apart from the sealing surface 57. Upwardly urging the stem 21 so the upper portion 55 and sealing surface 57 become engaged results in a force urging the lower surface 49 and flex element 67 into contact thereby enhancing the sealing functions between the retainer 63 and backseat element 47.

Figure 4:
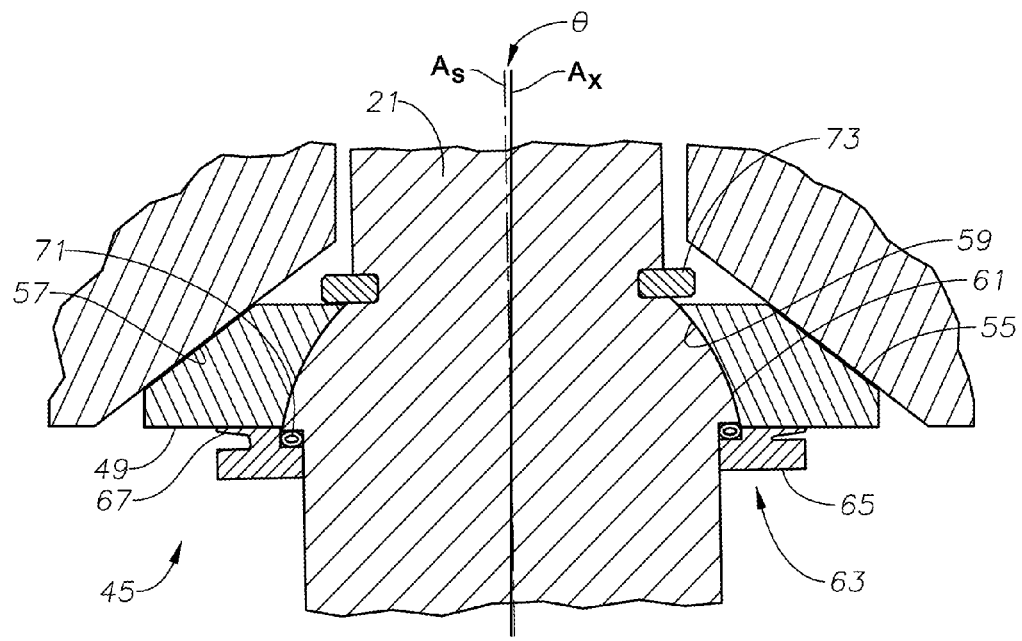
FIG. 4 is a side sectional view of the example of FIG. 3 with the stem misaligned in accordance with the present disclosure.

An advantage of the backseat seal assembly 45 enclosed herein is illustrated in side sectional view in FIG. 4. As shown, the stem 21 has tilted coaxial to axis $A_S$, which is at an angle $\theta$ with respect to the axis $A_X$ of the valve assembly 11. However, the complementary curved surfaces respectively of the inner surface 59 and profile 61 allow the pivoting action between the stem 21 and backseat member 47 to take place without compromising the sealing ability of the backseat seal assembly 45. More specifically, sealing interfaces are maintained between the upper portion 55 and sealing surface 57, the retainer 63 and backseat member 47, and retainer 63 and stem 21. Maintaining the sealing interface between the retainer 63 and flex member 47 when the stem 21 tilts is due at least in part to the spring-like action of the flex element 67, which allows compression of the flex element 67 on one side (schematically represented on the right side of FIG. 4) and axial movement of the portion of the flex leg 67 upward where the body 65 has angled downward from the tilt of the stem 21. A left side of FIG. 4 illustrates a relaxed flex element 67 that continues to maintain a sealing surface against the lower surface 49 of the backseat element 47. Also, because the retaining element 63 is mounted to the stem 21, the O-ring 71 remains in place against the stem 21 to continue sealing along the outer surface of the stem 21. Accordingly, misalignment of stems may be accommodated with use of the design and method described herein while yet still achieving successful backseat sealing within a gate valve.

Figure 5:
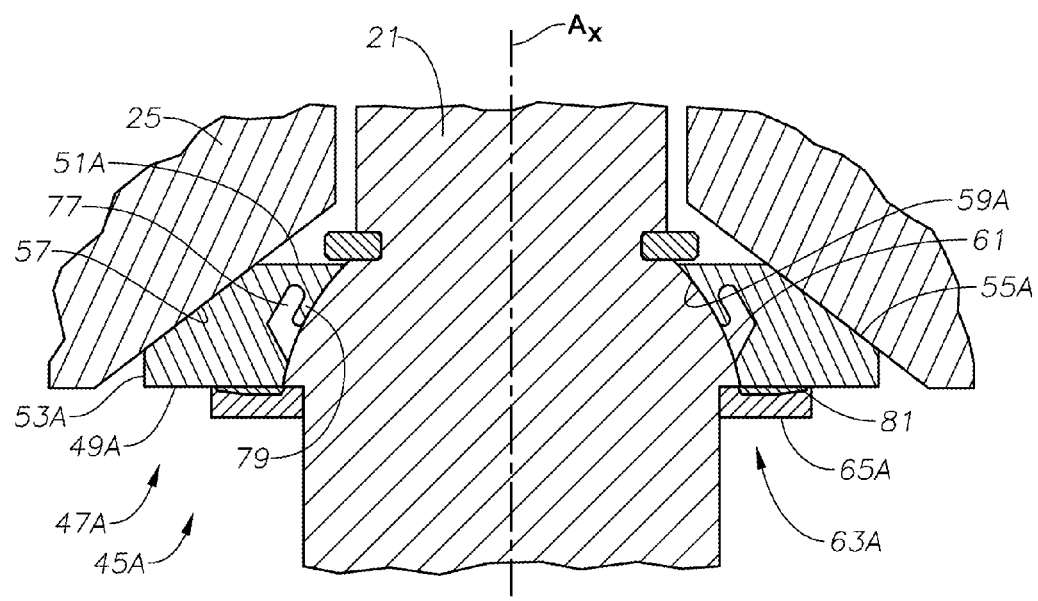
FIG. 5 is a side sectional view of an alternate embodiment of the backseat stem seal between a stem and bonnet of FIG. 3 in accordance with the present invention.

FIG. 5 is a side sectional view of an alternate example embodiment of a backseat seal assembly 45A for use between a stem 21 and bonnet 25 of a valve assembly. The backseat element 47A of FIG. 5 is shown having a recess 77 formed along its inner surface 59A. The recess 77 extends radially outward from the inner surface 59A and has a portion that runs parallel to the inner surface 59A but set back radially outward therefrom. This portion of the recess 77 defines a flex leg 79 that forms a portion of the inner surface 59A and responds similar to a cantilever member. Strategically forming of the flex leg 79 provides a force from the leg 79 that is directed radially inward onto an outer surface of the profile 61 and forms a sealing interface between the backseat member 47A and stem 21. Also optionally, the retaining element 68A is shown having a body 65A whose cross-section is substantially rectangular and wherein the retaining element 63A mounts circumferentially around the stem 21 adjacent a lower end of the profile 61. Optionally, included on an upper surface of the body 65A is an inlay 81 that may be formed from a metal softer than the metal of the backseat member 47A. Similar to the embodiments of FIGS. 2 through 4, the embodiment of the backseat seal assembly 45A of FIG. 5 can maintain sealing in the stem passage 22 even in conditions when the stem 21 is tilted as illustrated in FIG. 4. In one example, the soft metal inlay 81 provides a resilient body that can allow for the tilting movement while maintaining a sealing function.

If leakage past the stem seals 27 is detected, the backseat seal assembly 45 can be energized (FIG. 2) to block pressure communication between the cavity 14 and above the opening 56. In an example, energizing the backseat seal assembly 45 can be done by releasing the set screw and unscrewing collar 37 from bonnet neck 26 a selected distance. The pressure in gate cavity 15 causes stem 21 and backseat member 47 (FIG. 2) to move upward an increment until the upper portion 55 and sealing surface 57 contact each other and deflect to form a metal-to-metal seal. The stem seals 27 can be replaced with pressure in the cavity 15 being isolated. Normally, the pressure in gate cavity 15 is first relieved before removing stem seals 27 (FIG. 1). After replacing the stem seals 27, the collar 37 is retightened that pushes stem 21 downward to the position shown in FIG. 2. This sets the upper portion 55 away and out of contact with the sealing surface 57.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A gate valve assembly comprising:
   a body having a cavity formed therein;
   a neck opening formed through the body and having a conically shaped portion that intersects with the cavity;
   a stem that projects into the neck opening in the body and having an end in the cavity that is coupled to an end of a gate;
   a profile circumscribing a portion of the stem and having a radius that changes along a length of the stem; and
   a ring like backseat member slidingly and pivotingly set over the profile and having an inner surface complementary to an outer surface of the profile and an outer surface with a portion complementary to the conically shaped portion of the neck opening, so that when the stem is urged in a direction that wedges the backseat member between the profile and the conically shaped portion, a seal is formed between the stem and neck opening.

2. The gate valve assembly of claim 1, further comprising an annular retainer mounted around the stem and positioned adjacent a lower surface of the backseat member to define a resilient sealing interface between the retainer and backseat member, so that when the stem tilts from an aligned position to an unaligned position, the sealing interface is maintained in the unaligned position.

3. The gate valve assembly of claim 2, wherein the retainer comprises a retainer body, a furrow formed in an outer radial surface of the retainer body that defines a spring like flex element that projects radially outward from the retainer body and that biases against the lower surface of the backseat member to form a sealing interface.

4. The gate valve assembly of claim 3, further comprising an o-ring that is provided in a space between an upper end of the retainer body and a lower end of the profile.

5. The gate valve assembly of claim 1, wherein a recess is formed along the inner surface of the backseat member and a flex leg having an elongated cross section depends from an interface between the recess and inner surface and biases against the profile.

6. The gate valve assembly of claim 5, further comprising an annular retainer circumscribing the stem adjacent a lower end of the profile and a soft metal inlay on an upper surface of the retainer that contacts a lower surface of the backseat member that forms a sealing interface.

7. The gate valve assembly of claim 5, wherein the flex leg forms a sealing interface when biased against the profile that is maintained with rotation and tilting of the stem with respect to the backseat member.

8. The gate valve assembly of claim 1, wherein the profile has a spherical type curvature.

9. A gate valve assembly comprising:
a body having a cavity formed therein;
a stem passage in the body having a conically shaped opening that is adjacent the cavity;
an elongated cylindrically shaped stem that extends from within the cavity and into the stem passage;
a profile circumscribing a portion of the stem having a curved outer surface that resembles a portion of a sphere;
an annular backseat member having an inner surface formed complementary to the curved outer surface of the profile and an outer surface that is in selective sealing engagement with the conically shaped opening; and
a spring like member that forms a sealing interface adjacent a surface of the backseat member when the outer surface of the backseat member is in sealing engagement with the conically shaped opening.

10. The gate valve assembly of claim 9, wherein the spring like member comprises a flex leg disposed on the inner surface of the backseat member and that is selectively biased against the profile.

11. The gate valve assembly of claim 10, wherein a recess is formed in the backseat member that extends radially outward a distance from the inner surface and substantially parallel with the inner surface to define the flex leg.

12. The gate valve assembly of claim 10, further comprising an annular retainer circumscribing the stem and having a soft metal inlay on an upper surface that sealingly engages a lower surface of the backseat member.

13. The gate valve assembly of claim 9, wherein the spring like member comprises a flex element that resiliently maintains a sealing interface on a lower surface of the backseat member.

14. The gate valve assembly of claim 13, wherein the flex element is part of an annular retainer that circumscribes the stem adjacent a lower end of the profile and wherein a metal o-ring is disposed in sealing contact between an inner surface of the annular retainer and an outer circumference of the stem.

15. A gate valve assembly comprising:
a body having a cavity formed therein;
a stem passage in the body having a conically shaped opening that is adjacent the cavity;
a stem assembly comprising an elongated cylindrically shaped stem that extends from within the cavity and into the stem passage, a profile circumscribing a portion of the stem having a curved outer surface, and an annular retainer circumscribing the stem adjacent a lower end of the profile;
an annular backseat member circumscribing a portion of the profile that provides a means for providing a seal between the stem and stem passage and that maintains the seal when the stem is tilted into an unaligned position.

16. The gate valve assembly of claim 15, further comprising a spring like member that forms a sealing interface adjacent a surface of the backseat member when the outer surface of the backseat member is in sealing engagement with the conically shaped opening.

* * * * *